June 22, 1943.  F. G. BOUCHER  2,322,615
LEVELING DEVICE
Filed Sept. 8, 1941
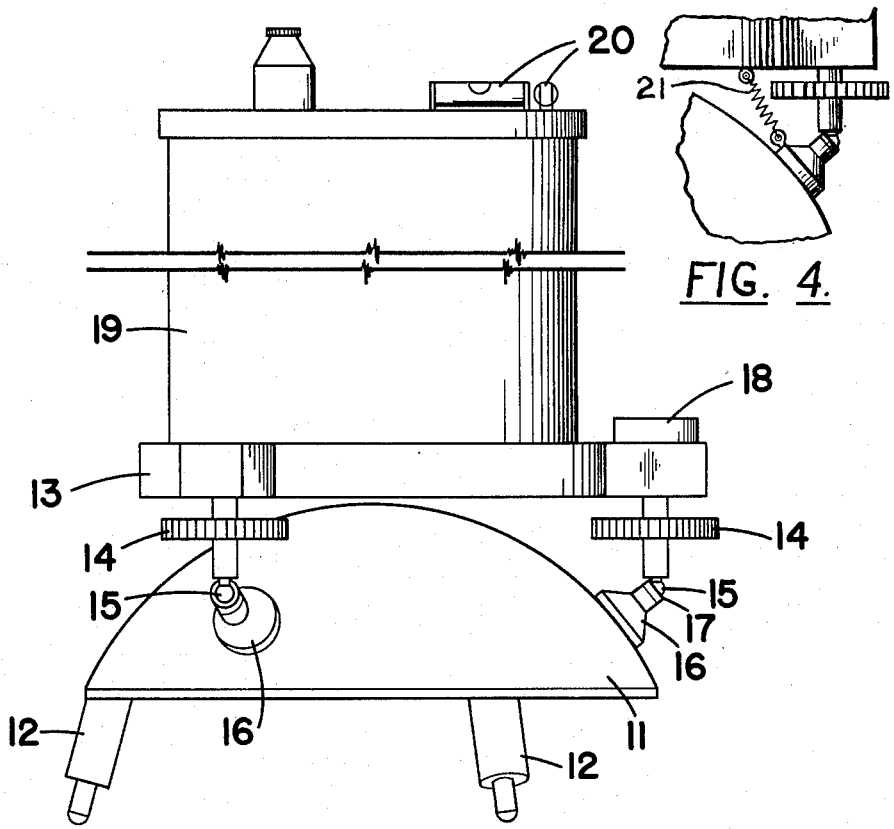
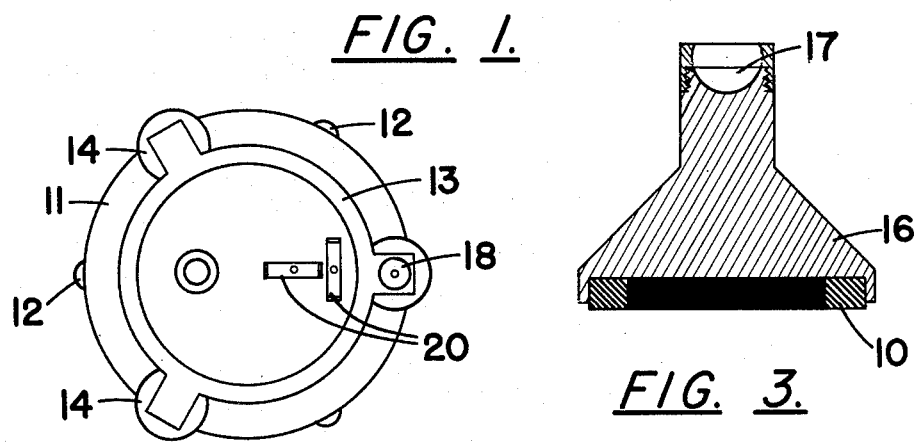
Frank G. Boucher INVENTOR.
BY J. G. McKean
ATTORNEY Patented June 22, 1943

2,322,615

UNITED STATES PATENT OFFICE 2,322,615

LEVELING DEVICE

Frank G. Boucher, Tulsa, Okla., assignor to Standard Oil Development Company, a corporation of Delaware Application September 8, 1941, Serial No. 410,006

3 Claims. (Cl. 248—180)

The present invention is directed to a device for supporting and leveling instruments.

An object of the present invention is to produce a device for supporting instruments on rough surfaces which allows the instruments to be quickly and easily leveled. Another object of the present invention is to produce a device which can be readily transported for use with exploratory and surveying instruments to support and level such instruments.

Other objects and advantages of the present invention may be seen from the following description taken in conjunction with the drawing, in which—

Fig. 1 is a front elevation of an embodiment of the present invention;

Fig. 2 is a top view of the same embodiment; and

Fig. 3 is a fragmentary view showing one of the supporting members.

Fig. 4 is a detail view showing the spring arrangement.

Referring now specifically to the drawing, member 11 is constructed with its upper surface in the form of a segment of a sphere and has attached to its under side equidistantly spaced legs 12, which form a supporting tripod. Member 13, shaped in the form of a ring, is provided with equidistantly spaced leveling screws 14 extending downwardly with their longitudinal axes at right angles to the plane of member 13. The lower end of each leveling screw 14 terminates in ball 15. A cup 16, having its upper end terminating in a socket joint 17 is attached to each leveling screw 14. Socket 17 cooperates with ball 15 to form a ball and socket joint allowing the cup to be moved through a large angle with respect to screw 14. It is preferred to arrange a light spring between each of the cups 16 and member 13 to hold the under surface of the cups approximately parallel with the surface of the sphere with which it comes in contact, as will be hereinafter more fully described. It will be understood that cups 16 are preferably constructed of an unyielding material such as metal, and are provided with a rubber gasket 10 to aid the cups in gripping the spherical surface of member 11.

It will be understood that the supporting and leveling device herein shown may be arranged to support any of a number of instruments. It has been found particularly effective in supporting gravity meters used in subsurface exploration. It is customary in constructing such devices to encase them in a cylindrical container, and the ring member 13 as shown in the drawing, is provided with a suitable recess for receiving the lower portion of the container. It will be obvious, however, that the shape of member 13 may be altered so that it will cooperate with any instrument with which the device is to be used, as, for example, range finders, plane tables, and other like instruments.

It will be understood in the embodiment of the device that members 11 and 13 will customarily be transported separately to a desired location and member 11 then arranged with legs 12 resting upon the surface at this point. Member 13 will then be arranged with cups 16 resting upon the spherical surface and moved about on the surface until the instrument supporting surface of ring 13 is approximately level as indicated by the target level bubble of target 18. Case 19 is then placed in position on the ring 13, and screws 14 adjusted so that the device is leveled as indicated by the leveling tubes 20 with which the instrument case 19 is provided.

It will be apparent that, if desired, ring 13 may be permanently attached to the instrument with which the supporting device is to be used, and under such circumstances the cylindrical surface is first placed on the desired spot and the instrument to which the ring is attached then placed in position, moved around until it is approximately level, and finally leveled by means of screws 14.

It will be obvious that I have disclosed a device which is particularly suitable for rough, rocky, and uneven ground, which may be readily transported, and which allows an instrument to be quickly and readily brought to the desired level position by taking measurements. It will be apparent that the size of the instrument may be varied as desired in order to obtain a suitable range of adjustment, coupled with ease of transportation.

The present invention having been thus described and illustrated, what is claimed as new and useful and is desired to be secured by Letters Patent is:

1. A device for leveling and supporting instruments comprising, in combination, a member having an upper surface in the shape of a portion of a sphere and a lower portion adapted to rest on an irregular surface, a second member arranged to carry an instrument and means for supporting said second member on said first member including only a plurality of like, downwardly depending members secured to said instrument carrying member each downwardly depending member terminating in a gripping cup provided with an annular deformable projection adapted for contacting said spherical surface of said first mentioned member.

2. A device for leveling and supporting instruments comprising, in combination, a member having an upper surface in the shape of a portion of a sphere, and a lower portion adapted to rest on an irregular surface, a second member arranged to carry an instrument, and means for supporting said second member on said first member consisting of a plurality of downwardly extending legs secured to said instrument carrying member, each leg being adjustable for length and terminating in a gripping cup having a flat lower surface with an annular readily deformable ledge secured thereto.

3. A device for leveling and supporting instruments comprising, in combination, a member having an upper surface in the shape of a portion of a sphere and a lower portion adapted to rest on an irregular surface, a second member arranged to carry an instrument, and means for supporting said second member on said first member consisting of three equidistantly spaced downwardly extending leveling screws attached to the lower surface of said member, a gripping cup secured to each leveling screw, each gripping cup being provided with a lower plane surface with a rubber ring secured thereto, and a ball and socket joint connecting the upper end of each gripping cup with its corresponding adjusting screw.

FRANK G. BOUCHER.